E. M. BRENNAN.
SCREW MAKING MACHINE.
APPLICATION FILED FEB. 11, 1920.
1,359,572.
Patented Nov. 23, 1920.
3 SHEETS—SHEET 3.
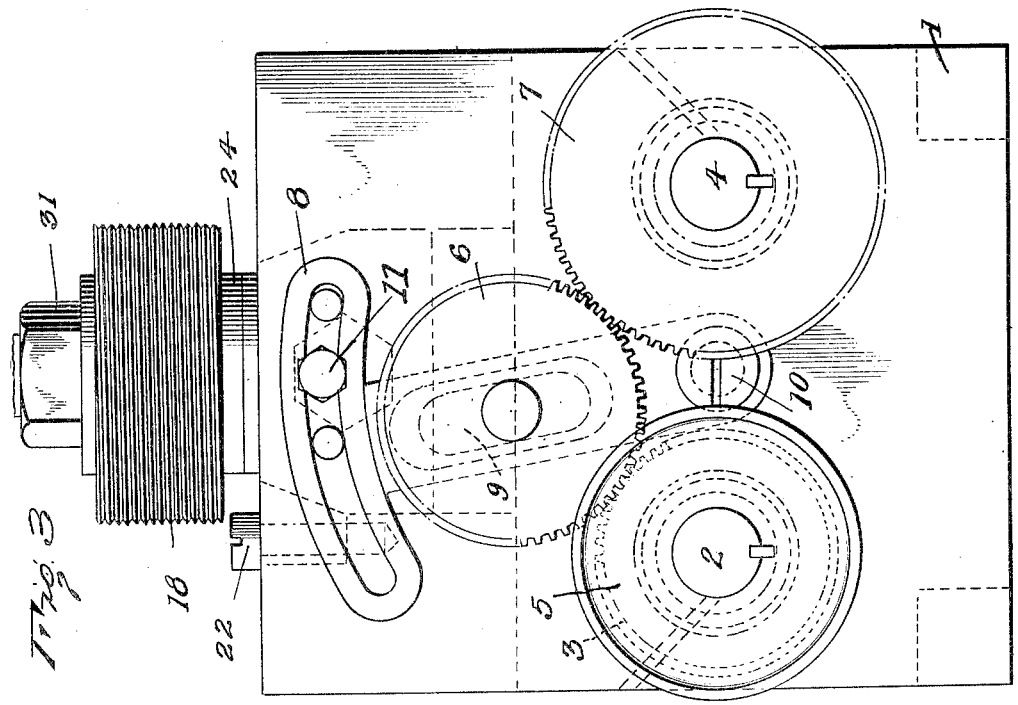
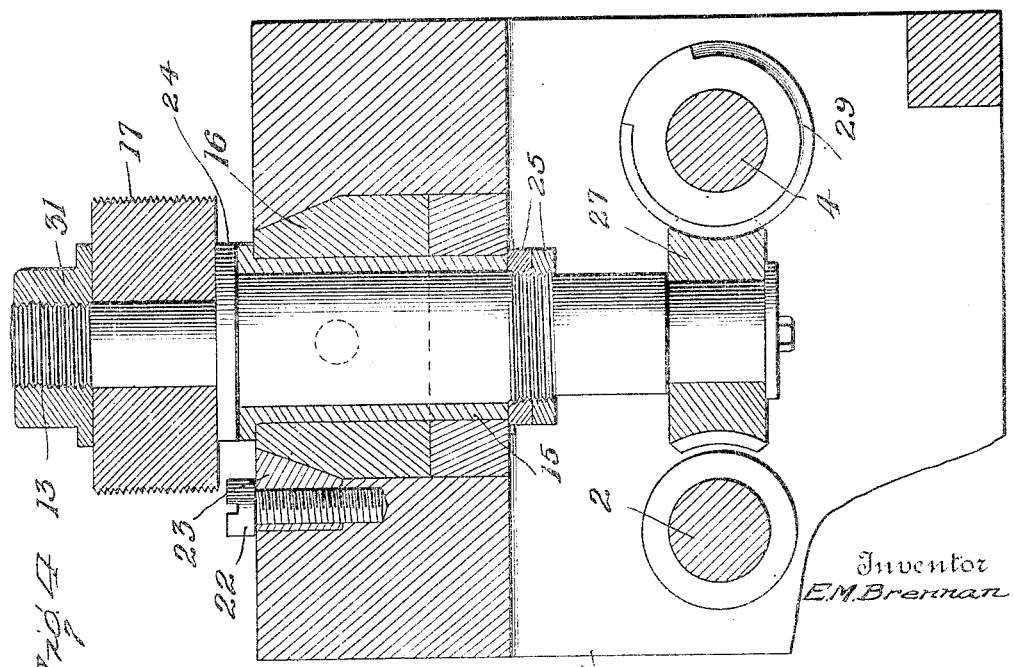
Inventor
E. M. Brennan
Attorney

United States Patent Office.

EDWARD M. BRENNAN, OF WATERBURY, CONNECTICUT.

SCREW-MAKING MACHINE.

1,359,572.   Specification of Letters Patent.   Patented Nov. 23, 1920.

Application filed February 11, 1920. Serial No. 358,006.

*To all whom it may concern:*

Be it known that I, EDWARD M. BRENNAN, a citizen of the United States of America, residing at Waterbury, in the county of New Haven and State of Connecticut, have invented certain new and useful Improvements in Screw-Making Machines, of which the following is a specification.

My invention relates to improvements in a screw threading machine and particularly has reference to that type of machine employing the rolling process for forming screws wherein the screw blanks are rolled between dies having circular form, the principal object of the invention residing in the provision of a machine capable of rapidly forming screws, bolts, rods, etc., and in a manner such as will effect a considerable saving in time and labor.

The invention also embodies as one of its characteristic features and objects, the provision of roller dies capable of relative adjustment whereby to permit the rolling of threads upon screw or bolt blanks or upon rods and the like differing in diameter, thus rendering the machine universal in its adaptation for different work.

Many additional structural advantages conductive to the objects sought will be more explicitly pointed out hereinafter.

In describing my invention in detail, reference will be had to the accompanying drawings wherein like characters of reference designate like or corresponding parts throughout the several views of which:

Fig. 3 is an end elevation of the machine; and

Fig. 4 is a vertical section through the same having a part broken away.

Figure 1:
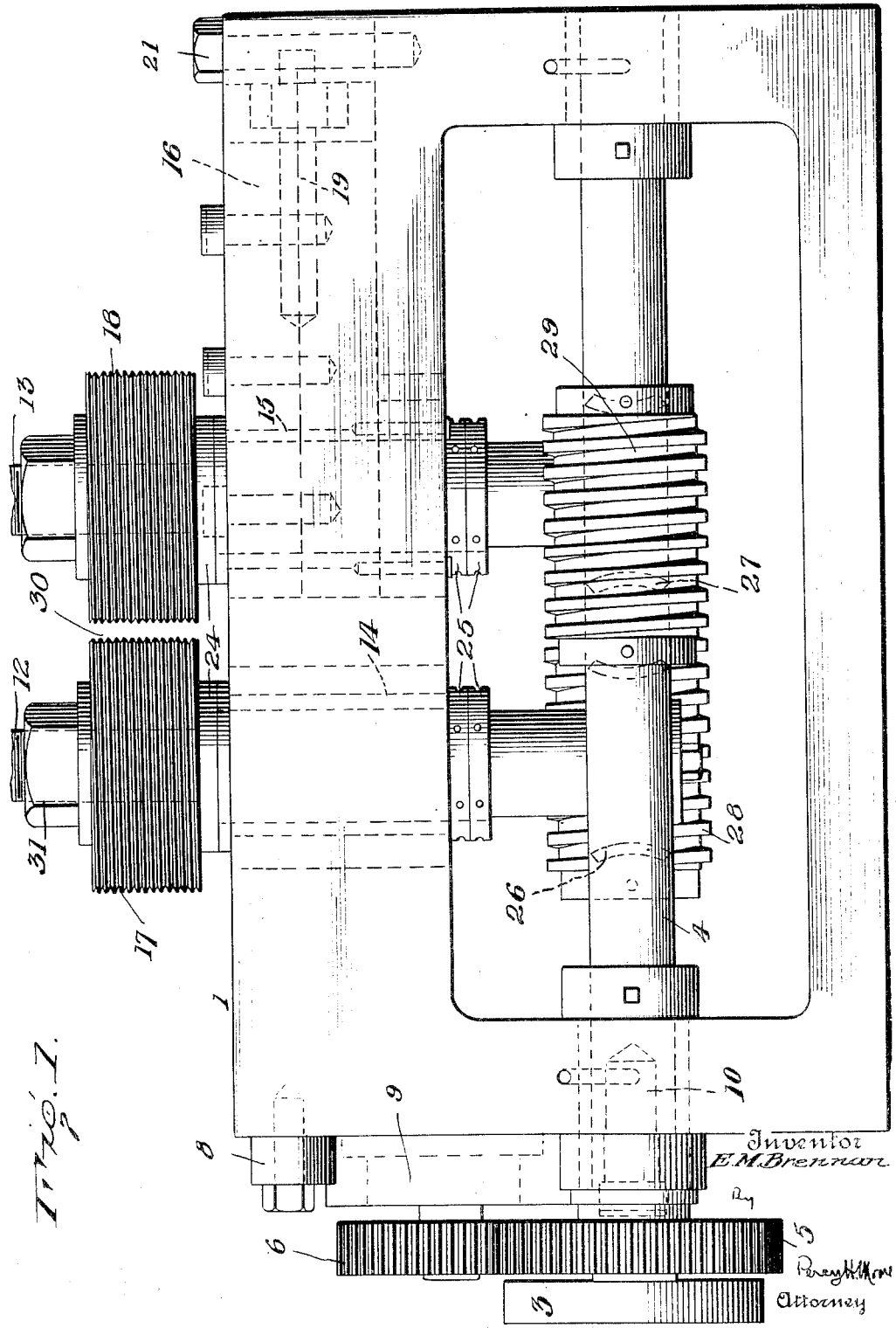
Figure 1 is a side elevation of my improved machine.
Figure 2:
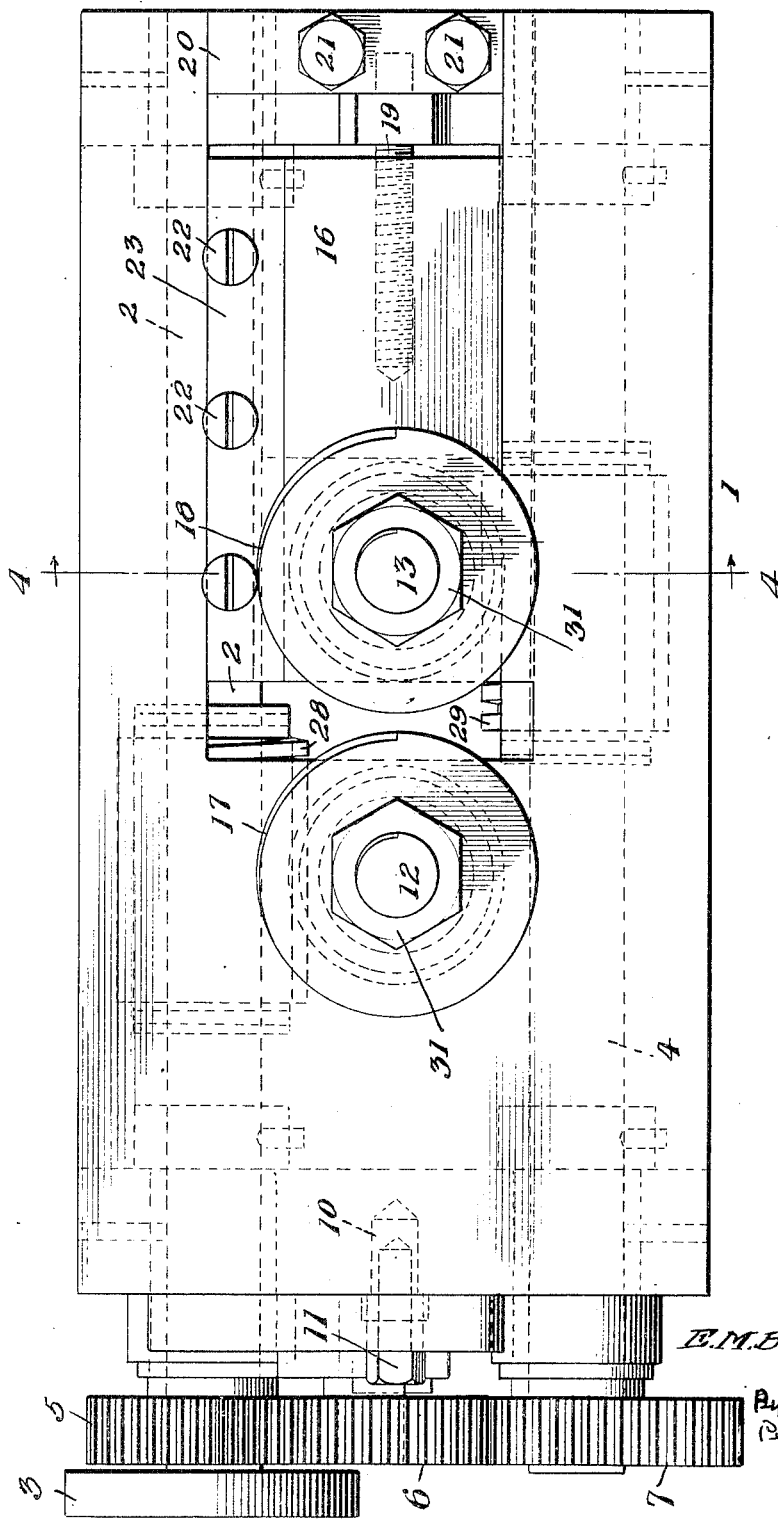
Fig. 2 is a top plan of the same.

In the embodiment of my invention herein illustrated and by me considered preferred the numeral 1 designates the bed of the machine in its entirety, substantially rectangular in shape, and having a shaft 2 mounted in bearings longitudinally of the same on which a driven pulley 3 is securely mounted and adapted to be engaged by a belt or similar device, while a counter shaft 4 is also journaled longitudinally of the frame, and has connection with the shaft 1 by means of intermeshing gears 5, 6 and 7, the gears 5 and 7 being keyed to the shafts 2 and 4 respectively, while the intermediate gear 6 is an idler and is supported on the adjacent end of the bed 1 by means of substantially T-shaped bracket 8 formed with a slotted segmental head portion while the shank portion thereof is slotted at 9 to receive the gear bearing and has its free end pivoted to said bed 1 by a screw 10 or its equivalent. Obviously the bearing carrying the gear in the slot 9 may be shifted, whereas the bracket may be swung about its pivot and then locked in an adjusted position by tightening a lock screw 11 passing through the slotted segmental head portion into engagement with the machine bed end; hence, allowing gears of different diameters to be substituted for the gear 6, such as conditions or preference may dictate.

Vertical spindles 12 and 13 are mounted in bearings 14 and 15 in the bed, the spindle 12 being immovable with relation to the bed, while the spindle 13 has its bearings arranged in a slidable block 16 positioned in a suitable way formed longitudinally of said bed, in order that relative adjustment between the roller dies 17 and 18 secured to the upper ends of the spindles 12 and 13 may be had. To adjust the block 16 longitudinally of the bed 1, I provide a screw 19, engaging the same in a screw threaded bore in the block and in an end thrust plate 20 secured to the bed by bolts 21; the squared end of said screw 19 projecting sufficiently to permit of engagement therewith by a wrench. With the desired adjustment of the die 18 and its spindle 13 obtained, the block 16 is clamped in position by tightening screws 22 engaging the bed and bearing on a gib 23, which gib in turn will bind upon said block 16 and thus prevent its further movement.

To maintain the spindles 12 and 13 in their vertical positions, flanges 24 are formed on each spindle between the dies thereon and the top of the bed, while lock nuts 25 are engaged with the lower portions of the spindles and have bearing on the under side of the bed top.

Worm gears 26 and 27 are fixed upon the shafts 2 and 4 respectively, the gear 26 meshing with one side of a spiral gear 28 carried on the lower end of the spindle 12, while the gear 27 meshes with the opposite side of a second spiral gear 29 carried on the lower end of the spindle 13, thus permitting of the transmission of rotary motion in opposite directions to the dies 18 via their spindles 12 and 13.

The operation of my improved machine may be reviewed as follows:

Screw blanks from a suitable hopper (not shown) located in proximity to the die are fed to said dies, the heads of the screws being downwardly disposed so that the same enter the space designated 30 between said dies and the shanks travel between the thread rolling peripheral portions of the same. Because of the fact that these dies 17 and 18 are rotating in opposite directions, the shank portions of the blanks will be engaged and rolled therebetween, thus, allowing the cutting of uniform screw-threads therein entirely about the shanks. The screws thus formed between the rolling thread rolling dies continue in their travel and can, if desired be discharged into a suitable receiving receptacle therefor. In the event that work of a different diameter is to be done by the machine, the screws 22 are loosened and the die 18 is then adjusted by turning the screw 19 to effect sliding movement of the block 16 carrying the spindle 13, whereupon the same is then locked in the manner hereinbefore set forth.

The dies 17 and 18 may be of any desired size and also, may be formed with rolling threads of a depth and pitch sufficient to give the required depth and pitch of the threads on the screws to be made. Further, it will be seen upon reference to Fig. 1 that the dies may be interchanged due to the fact that they are only secured in position upon their respective spindles by lock nuts which may be indicated for the purpose of convenience, by the numeral 31.

Furthermore, it should be noted that by reason of the manner in which the shaft 4 is driven, that is through power transmission gearing 5, 6 and 7, the die 18 rotated thereby will be driven a velocity higher than that at which the die 17 is rotating, and in consequence, the shank portions of the screw blanks fed between said dies will be rolled or rotated between the dies in order that continuous screw threads will be formed entirely about the same.

Various modes of supporting the machine can be employed to accord with conditions present at its installation, it being practicable to place the same upon legs or a stand so as to secure a suitable working height.

While I have illustrated the embodiment of my invention which I consider preferred, I desire it to be understood that the arrangement of parts may be varied without in any way departing from the spirit of the invention as claimed.

What I claim is:

In a screw making machine, a bed having a longitudinal way formed in one portion of its top, a vertical spindle rotatably mounted in bearings in said bed, a block slidable in said way, means for imparting sliding movement to the block, other means for clamping said block in an adjusted position, a second spindle rotatably mounted in said block, each of said spindles having annular flanges thereon bearing on the tops of said bed and block respectively, lock nuts engaged with the lower ends of said spindles, roller dies on the upper ends of said spindles adapted to receive blanks to be rolled therebetween, and means for rotating said spindles and dies in opposite directions.

In testimony whereof I affix my signature in presence of two witnesses.

EDWARD M. BRENNAN.

Witnesses:
EDWARD J. FIEW, Jr.,
ADELE H. ZIBURIS.